United States Patent
Chellappa et al.

(10) Patent No.: US 7,681,069 B1
(45) Date of Patent: Mar. 16, 2010

(54) CORRUPTION CHECKING DURING BACKUP

(75) Inventors: Sridhar Chellappa, Mars, PA (US); E. Rudolph Nedved, Mercer, PA (US)

(73) Assignee: Netapp, Inc., Sunnyvale, CA (US)

( * ) Notice: Subject to any disclaimer, the term of this patent is extended or adjusted under 35 U.S.C. 154(b) by 893 days.

(21) Appl. No.: 10/930,166

(22) Filed: Aug. 30, 2004

(51) Int. Cl.
*G06F 11/00* (2006.01)

(52) U.S. Cl. .............. 714/6; 714/13; 711/161; 711/162

(58) Field of Classification Search .......... 714/13, 714/6, 54; 711/161, 162
See application file for complete search history.

(56) References Cited

U.S. PATENT DOCUMENTS

| | | | |
|---|---|---|---|
| 5,511,164 A * | 4/1996 | Brunmeier et al. ........... | 714/53 |
| 6,032,216 A * | 2/2000 | Schmuck et al. ............ | 710/200 |
| 6,928,607 B2 * | 8/2005 | Loaiza et al. ............... | 714/807 |
| 6,993,679 B2 * | 1/2006 | George ......................... | 714/8 |
| 7,003,702 B2 * | 2/2006 | Budd et al. .................. | 714/48 |
| 7,024,583 B2 * | 4/2006 | Nguyen et al. ............... | 714/5 |
| 7,092,976 B2 * | 8/2006 | Curran et al. ............... | 707/204 |

\* cited by examiner

*Primary Examiner*—Philip Guyton
(74) *Attorney, Agent, or Firm*—Perkins Coie LLP

(57) ABSTRACT

In one embodiment, a data corruption checker is integrated into the data backup operation. In one embodiment, the data corruption checker can skip over minor corruptions and back up the non-corrupt files, or can abort the backup and locate a major corruption. In one embodiment, the present invention includes receiving a backup command at a storage server, the backup command requesting that the storage server perform a backup operation on a storage component, scanning a set of inodes associated with the storage component to determine a subset of inodes corresponding to files to be backed up, and, as part of the scanning, identifying one or more corrupted files.

26 Claims, 5 Drawing Sheets

CORRUPTION CHECKING DURING BACKUP

FIELD OF THE INVENTION

At least one embodiment of the present invention pertains to data storage techniques, and more particularly, to a method and apparatus for performing a backup operation.

BACKGROUND

A file server is a type of storage server that operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in; which file servers can be used is a network attached storage (NAS) configuration. In a NAS configuration, a file server can be implemented in the form of an appliance that attaches to a network, such as a local area network (LAN) or a corporate intranet. Examples of such an appliance include any of the NetApp Files products made by Network Appliance, Inc. in Sunnyvale, Calif., or the SpinServer® products formerly made by Spinnaker Networks, Inc., which was acquired by Network Appliance.

A file server can be used to store data redundantly, among other things. One particular type of data redundancy technique is known as data replication, also referred to as "mirroring". Mirroring involves making a copy of data stored at a primary site by storing an exact duplicate (a mirror image) of the data at a remote secondary site. In the mirroring context, the copy at the primary site is generally referred to as the data source, and the secondary site where the copy is made is referred to as the data destination. Thus, the term mirror image can be used interchangeably with data destination, mirroring data destination, data replication data destination, and so on. The purpose is that, if data is ever lost at the primary site, it can be recovered from the secondary site.

In a simple example of a mirroring configuration, a source file server located at the primary site may be coupled locally to a first set of mass storage devices, to a set of clients through a local area network (LAN), and to a destination file server located at a remote site through a wide area network (WAN) or metropolitan area network (MAN). The destination storage server located at the remote site is coupled locally to a second set of mass storage devices at the secondary site.

Additional safeguards against data loss can be implemented by a file server. One such safeguard is data backup. During a backup operation, data is copied to some backup facility, generally some mass offline storage such as digital tape. There are several standardized backup protocols available, such as the Network Data Management Protocol (NDMP) data backup. There are also various mass offline storage facilities available, such as digital tape libraries.

When a portion of the data being backed up is corrupted, the backup application can crash during execution. This results in no data being backed up and a waste of resources, as the backup may have been executing for hours before the crash. Furthermore, the administrator would then have to find and remedy the corruption by executing some data repair program, such as spiff, that can take hours to locate the corrupt data.

SUMMARY OF THE INVENTION

In one embodiment, a data corruption checker is integrated into the data backup operation. In one embodiment, the present invention includes receiving a backup command at a storage server, the backup command requesting that the storage server perform a backup operation on a storage component, and performing corruption checking over the storage component as part of the backup operation performed in response to the backup command.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
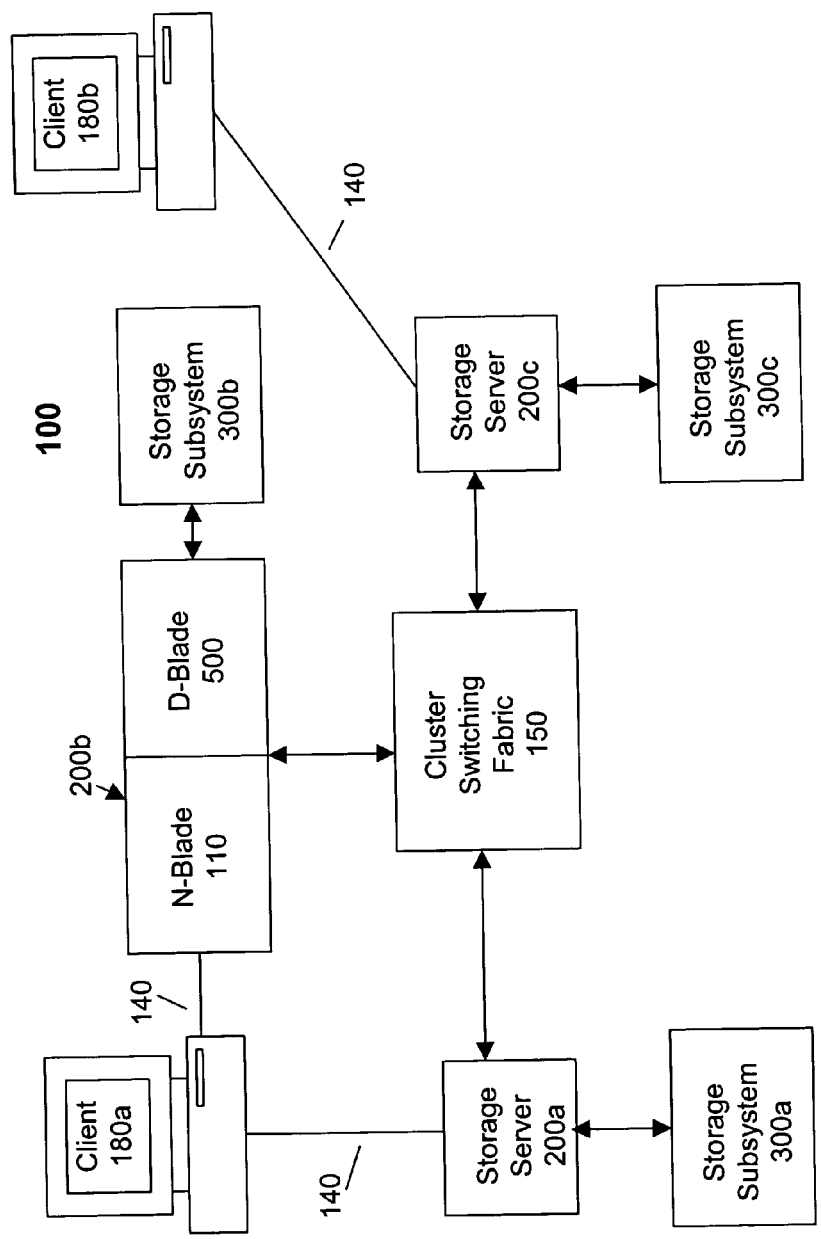
FIG. 1 is a block diagram illustrating a storage network cluster according to one embodiment of the present invention.

A method and apparatus for performing a backup operation is described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

One embodiment of a storage network is now described with reference to FIG. 1. In FIG. 1, a plurality of storage servers 200 are interconnected as a cluster 100 and configured to provide storage service relating to the organization of information on storage devices. In one embodiment the storage servers 200 comprise various functional components that cooperate to provide a distributed file system architecture for the cluster 100. In another embodiment the cluster 100 does not provided a distributed file system. In yet another embodiment, the cluster 100 is merely an interconnected network of storage servers. However, the present invention may be implemented in any architecture in which one or more storage servers are connected to a backup facility using any wired or wireless networking technology. The configuration in FIG. 1 is provided merely as an example context for implementing one embodiment of the present invention. Cluster 100 can be a fully integrated distributed file system, a loosely interconnected group of storage servers, or any other configuration configured to implement an embodiment of the present invention as described below.

In one embodiment, the storage servers 200 comprise SpinFS® storage servers (SpinServers) formerly from Spinnaker Networks, now from Network Appliance. In another embodiment, the storage servers comprise NetApp Filers® from Network Appliance. Other file servers and storage servers may also be used. In one embodiment, each storage server 200 is generally organized as a network element (N-blade 110) and a disk element (D-blade 500). The N-blade 110 includes a plurality of ports that couple the storage server 200 to clients 180 over a computer network 140, while each D-blade 500 includes a plurality of ports that connect the storage server to a storage subsystem 300. The N-blades 110 and D-Blades 500 need not be contained in the same physical device. The functionality of the N- and D-blades may be contained in a single system or distributed among several systems. In one embodiment, the cluster 100 has a group of dynamically allocable N- and D-blades that can own various portions of one flexibly allocated storage pool. In another embodiment, the N- and D-blade functionalities are not separated.

The storage servers 200 are interconnected by a cluster switching fabric 150 that, in one embodiment, may be embodied as a Gigabit Ethernet switch. An example distributed file system architecture that may be used is described in further detail in U.S. Patent Application Publication No. US 2002/0116593 titled "Method and System for Responding to File System Requests," to M. Kazar et al. published Aug. 22, 2002. The storage servers 200 may be interconnected using various technologies, thus, the cluster switching fabric 150 can also be embodied using any LAN, MAN, WAN, WLAN, Ethernet, and switched protocols, whether wired or wireline, or any other networking protocols to be developed in the future.

One embodiment of a storage server 200 is now described with reference to FIG. 2. The storage server 200 in FIG. 2 includes a plurality of processors 222, a memory 224, a network adapter 225, a cluster access adapter 226 and a storage adapter 228 interconnected by a system bus 223. The cluster access adapter 226 comprises a plurality of ports adapted to couple the storage server 200 to other storage servers of the cluster 100. In the one embodiment, Ethernet is used as the clustering protocol and interconnect media, although other types of protocols (both wireline and wireless) and interconnects may be utilized within the cluster architecture described herein.

Figure 2:
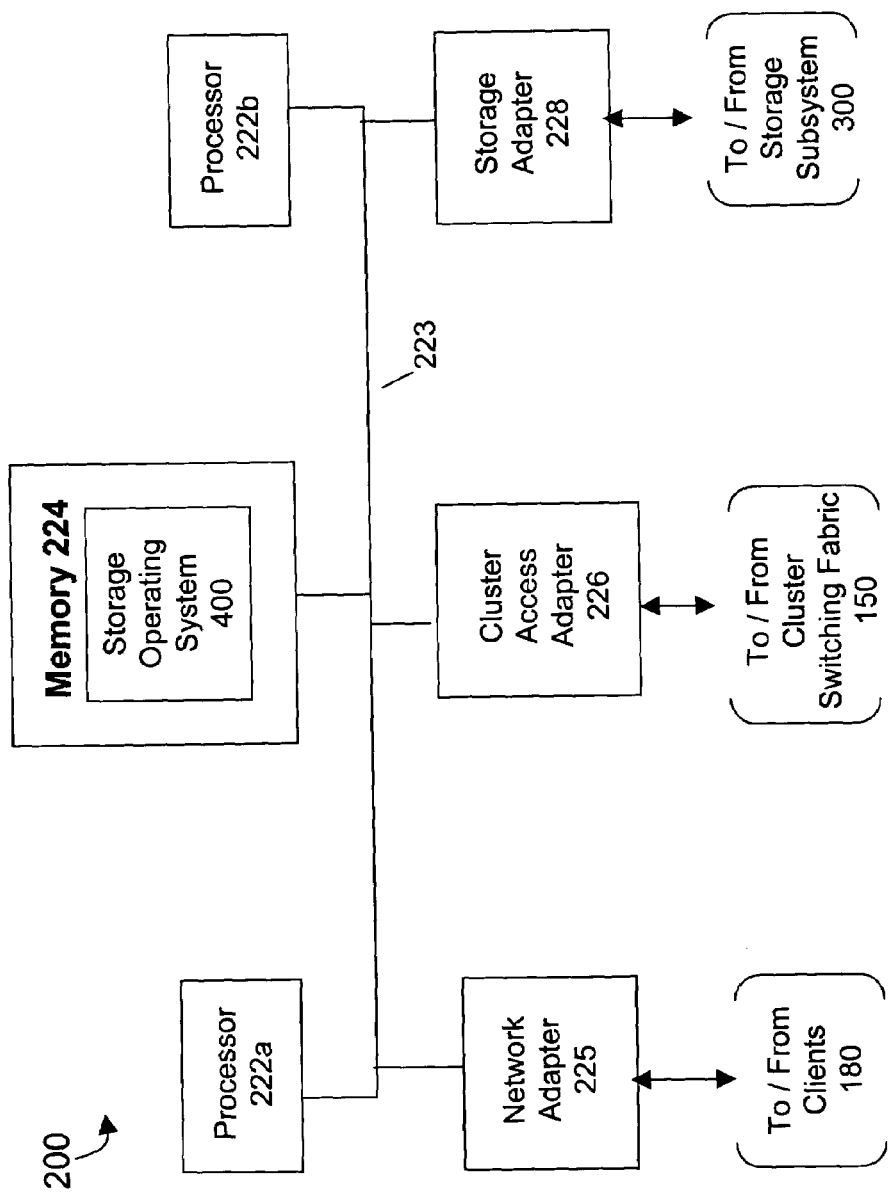
FIG. 2 is a block diagram illustrating a storage server according to one embodiment of the present invention.

The storage server 200 in FIG. 2 is shown as a dual processor server executing a storage operating system 400 that provides a file system configured to logically organize the information, as a hierarchical structure of named directories and files on storage subsystem 300. However, the storage server 200 may alternatively have only one processor 222, or more than two processors. In one embodiment, one processor 222a executes the functions of the N-blade 110 on the storage server 200, while the other processor 222b executes the functions of the D-blade 500.

In one embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the storage server 200 by, among other things, invoking storage operations in support of the storage service implemented by the storage server 200. Other processing and memory means, including various computer readable media, may be used for storing and executing program instructions pertaining to the inventive system and method described herein.

The network adapter 225 comprises a plurality of ports adapted to couple the storage server 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the storage server to the network. For such a network attached storage (NAS) based network environment, the clients 180 are configured to access information stored on the storage server 200 as files. The clients 180 communicate with each storage server 200 over network 140 by exchanging discrete frames or packets of data according to pre-defined protocols, such as the Transmission Control Protocol/Internet Protocol (TCP/IP).

The storage adapter 228 cooperates with the storage operating system 400 executing on the storage server 200 to access information requested by the clients. The information may be stored on disks or other similar media adapted to store information. In one embodiment, the storage adapter 228 has a plurality of ports having input/output (I/O) interface circuitry that couples to the disks over an I/O interconnect arrangement, such as a conventional high-performance, FiberChannel (FC) link topology. The information is retrieved by the storage adapter 228 and, if necessary, processed by the processor 222 (or the adapter 228 itself) prior to being forwarded over the system bus 223 to the network adapter 225 where the information is formatted into packets or messages and returned to the clients.

Figure 3:
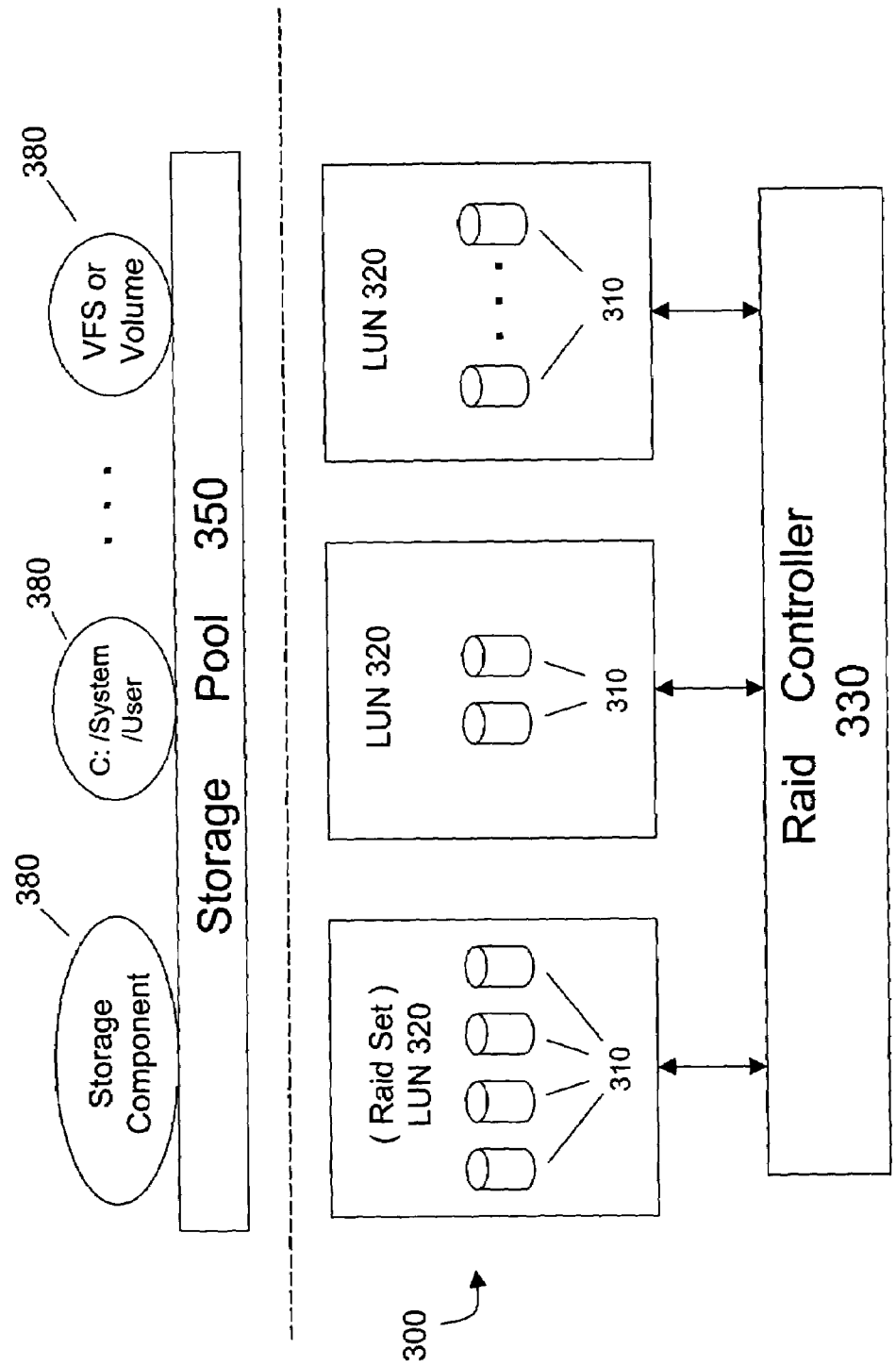
FIG. 3 is a block diagram illustrating a storage pool according to one embodiment of the present invention.

One embodiment of the storage subsystem 300 is now described with reference to FIG. 3. Storage of information on the storage subsystem 300 is implemented, in one embodiment, as a plurality of storage disks 310 defining an overall logical arrangement of disk space. The disks 310 are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

In one embodiment, each RAID set is configured by one or more RAID controllers 330. In one embodiment, the RAID controller 330 exports a RAID set as a logical unit number (LUN 320) to the D-blade 500, which writes and reads blocks to and from the LUN 320. One or more LUNs are illustratively organized as a storage pool 350.

In one embodiment, each storage pool 350 is further organized as a plurality of storage components 380. A storage component 380 is a basic unit (universal container) of data that can be manipulated as a unit. In one embodiment, a storage component 380 is a virtual file system (VFS) organized within the storage pool 350 according to a hierarchical policy that, among other things, allows the VFS to be dynamically moved among storage servers of the cluster 100, thereby enabling the storage pool 350 to help control load distribution across individual storage pools 350.

In one embodiment, a storage component 380 is a volume having a root directory, as well as a number of subdirectories and files. In another embodiment, storage components can also include Q-Trees. A group of storage components 380 may be composed into a larger namespace. For example, a root directory (c:) may be contained within a root VFS ("/"), which is the VFS that begins a translation process from a pathname associated with an incoming request to actual data (file) in a file system. The root VFS may contain a directory ("system") or a mount point ("user").

In one embodiment, each storage component has a file containing metadata about all files contained in the storage component. This file is commonly referred to as an inode file, and each meta-data container associated with each file is an inode. An inode can contain various information (i.e., metadata) about a file, such as group ownership, access mode, type, size, last edit . . . etc, and is generally identified with a unique i-number (inode number). While inodes are used in most UNIX and UNIX-based operating systems, in the context of this document, and inode can refer to any container of metadata about a file.

In one embodiment, an inode also contains the block pointers for its associated file. A short file can be inserted into the inode instead of the block pointers. Such a file is referred to as an inline file. There are various types of files, some of which are especially important to the integrity of the storage component, such as directories. In other embodiments, storage components can be further organized by superblocks or root directories of other file system conventions.

To facilitate access to the disks 310 and information stored thereon, the storage operating system 400 implements a file system 450, such as a write-anywhere file system (e.g., WAFL®), a hybrid write-anywhere/write in-place file system (e.g., SpinFS®), or some other file system. The file system 450 logically organizes the information as a hierarchical structure of named directories and files on the disks. It is further contemplated that any appropriate storage operating system, including a write in-place file system, may be enhanced for use in accordance with the inventive principles described herein. In one embodiment, the storage operating system is a Data ONTAP® operating system from Network Appliance. Each "on-disk" file may be implemented as set of disk blocks configured to store information, such as data, whereas the directory may be implemented as a specially formatted file in which names and links to other files and/or directories are stored.

As used herein, the term "storage operating system" generally refers to the computer-executable code operable on a computer that manages data access. The storage operating system can also be implemented as a general purpose operation system, a microkernel (such as ONTAP®), an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage server. Moreover, the teachings of this invention can be adapted to a variety of storage server architectures including, but not limited to, a network-attached storage environment, a storage area network and disk assembly directly-attached to a client or host computer. The term "storage server" (also referred to sometimes as "storage system") should therefore be taken broadly to include such arrangements in addition to any subsystems configured to perform a storage function and associated with other equipment or systems.

Figure 4:
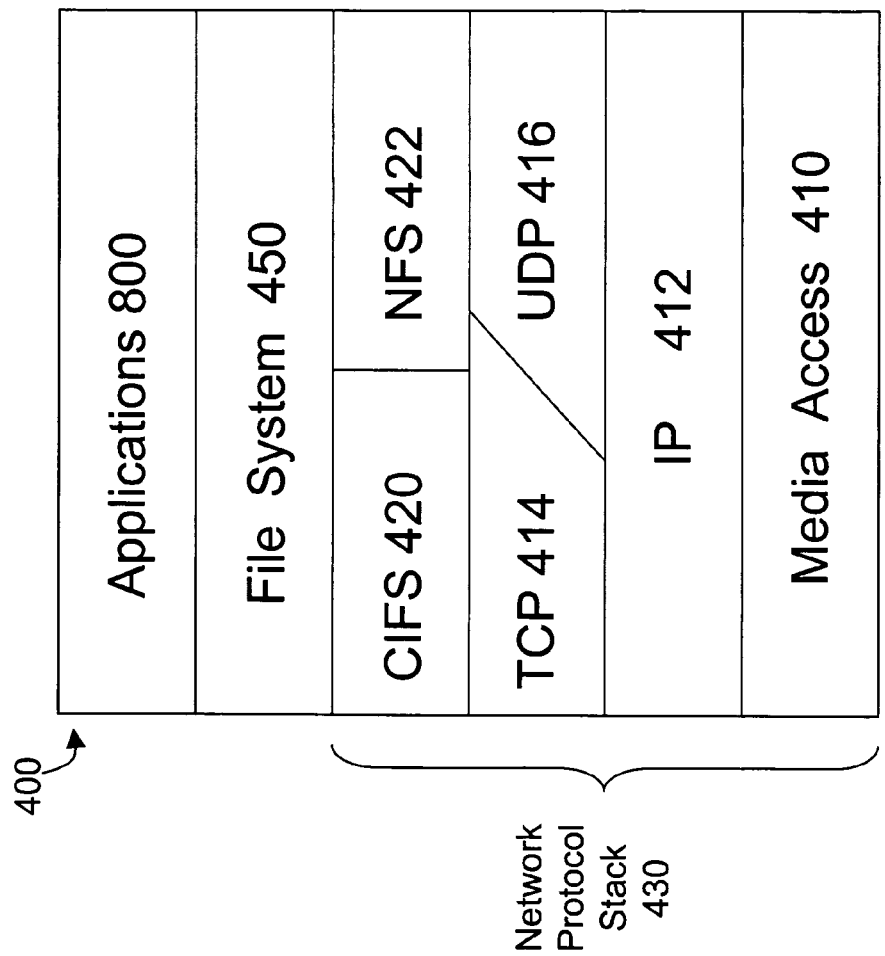
FIG. 4 is a block diagram illustrating a storage operating system according to one embodiment of the present invention.

One embodiment of the storage operating system 400 is now described with reference to FIG. 4. The storage operating system comprises a series of software layers organized to form an integrated network protocol stack 430 that provides a data path for clients to access information stored on the storage server 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS or WAFL® file systems) and, thus, includes support for the CIFS protocol 220 and the NFS protocol 222. As described further herein, a plurality of management processes executes as user mode applications 800.

In one embodiment, the processors 222 share various resources of the storage server 200, including the storage operating system 400. In such an embodiment, the N-blade 110 executes the integrated network protocol stack 430 of the operating system 400 to thereby perform protocol termination with respect to a client issuing incoming NFS/CIFS file access request packets over the network 150. The NFS/CIFS layers of the network protocol stack function as NFS/CIFS servers 422, 420 that translate NFS/CIFS requests from a client into file system protocol requests used for communication with the D-blade 500. The file system protocol provides operations related to those operations contained within the incoming file access packets.

In one embodiment, local communication between an N-blade and D-blade of a storage server is effected through the use of message passing between the blades, while remote communication between an N-blade and D-blade of different storage servers occurs over the cluster switching fabric 150.

In one embodiment, the storage server 200 implements a data protection technique, also referred to as data "backup." Data backup refers to backup of data to some offline storage facility, also sometimes referred to as offline backup. The backed up data is not necessarily unavailable on the network after offline backup, however, some loading is generally required to bring the data online. Thus, offline backup merely refers to the nature of the storage of the backed up data. Generally, the backup facility, such as a tape library, does not provide instant online access to data contained in the backup facility. However, the backed up data can be made available online using some file transfer protocol and automatic tape loading. In one embodiment, the data backup stores the data source to be backed up onto magnetic tape, such as digital tape.

In one embodiment, the storage server 200 uses a Network Data Management Protocol (NDMP)-based data backup. The NDMP is an open standard for data backup. However, other standards and protocols may be used as well. In the NDMP backup, a point-in-time image of the target files is made—which can be co-located with the data of the original files—and then the snapshot is copied to a backup facility.

In one embodiment, the backup facility is included in each local storage network 140. In other embodiment, backup can be centralized by connecting to the cluster switching fabric 150, or to any LAN, WAN, or MAN. There are numerous backup products that can be used by the storage servers 200 to carry out the backup operation, such as Data ONTAP® dump, SyncSort Backup Express, and Reliaty Backup. Also, any variety of mass offline storage facilities (devices) can be used to implement the backup capability, such as the Quantum ATL tape library.

Figure 5:
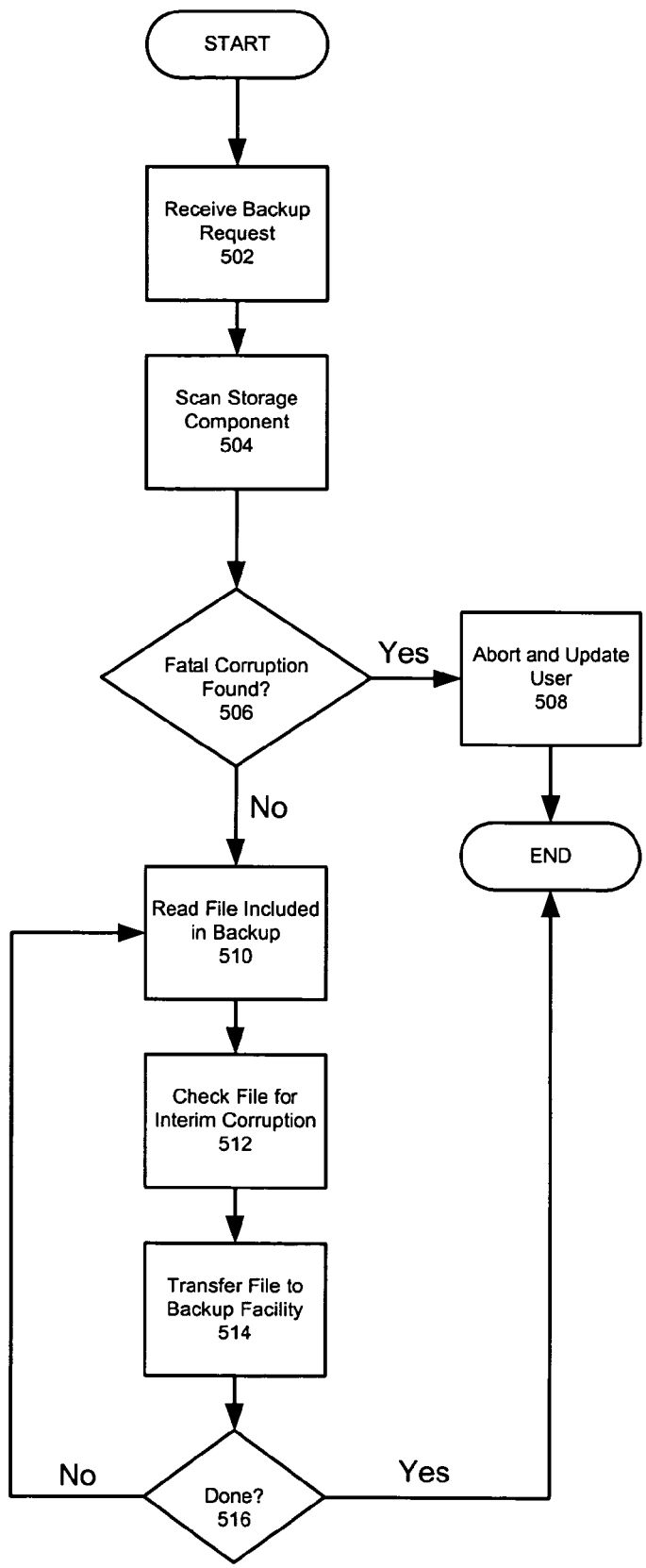
FIG. 5 is a flow diagram illustrating backup processing according to one embodiment of the present invention.

One embodiment, of backup processing that includes corruption checking is now described with reference to FIG. 5. In block 502, a storage server receives a backup request. In one embodiment, this request comes from one of the clients in the form of a backup command, such as the NDMP_START_BACKUP command. The backup request indicates a target storage component to be backed up. In one embodiment, the client may only indicate a generic description of the storage component, or some subset of the storage component, and the storage server identifies the target storage component from the information provided by the client.

In block 504, the storage server prepares for the backup by scanning the target storage component. In one embodiment, this is done by scanning the inode file (or other metadata file) of the storage component. In part, the scan identifies files that have been altered since the last backup, when an incremental backup is being performed. In one embodiment, the scan also identifies data corruption during the scan of the inode file.

In one embodiment, if a file appears corrupted based on a scan of its inode, then the corruption checker determines whether the corruption is fatal or non-fatal. If, in block 506 the corruption is determined to be fatal—for example a directory has been corrupted—then the backup is aborted in block 508. In one embodiment, the user requesting the backup is informed of the abortion of the backup. The abort message may indicate the location, cause, and seriousness of the data corruption.

However, if one or more non-fatal corruptions are found, then these files are not added to the backup list, and, in effect, are skipped during backup. In one embodiment, the output of the scan in block 504 is a file indicating which inode/file pairs to back up. Thus, if a file has not been altered-since the last backup, or if the file contains a non-fatal corruption, it is indicated as a. "no-backup" in the file created by the block 504 scan.

In one embodiment, if one or more non-fatal corruptions are identified during the block 504 scan, then a message is sent to the user that identifies these corrupted files. At that point, the user can attempt to repair the corrupted files with knowledge about their locations.

If there are no corruptions found in block 504, or the corruptions were found to be non-fatal corruption in block 506, then, from block 510 to block 514, files to be backed up are read into the storage server, re-checked for interim corruption, that is, corruption having occurred since the initial scan in block 504. As the files are being scanned in block 512, they are transferred, in block 514, to the backup facility in parallel, until all files are backed up and the process is deemed completed in block 516. Since a file may be read for backup hours after the initial block 504 scan was completed, re-checking for corruption in block 512 may be prudent and useful. In one embodiment, the corruption check performed in block 512 is the same as that performed during the scan in block 504. Similarly, if an interim corruption is detected in block 512, then the corrupt file can either be skipped if the corruption is not fatal, or the backup can be aborted if it is. Error messages indicating the skip or abort may then be sent to the user accordingly.

In one embodiment, corruption checking occurs on the file level, i.e., inode level. There are various test that can be implemented in various sequences to discover a broad range of corruption errors. Some of the possible errors are listed in Table 1 below.

TABLE 1

| Error | Class | Description |
|---|---|---|
| Corrupt Inode File | Abort | The inode file of the VFS to be backed up is corrupted. |
| No Directory Header | Abort | The directory that is being backed up does not have a valid header. |
| Corrupt Block Pointers | Abort/ Skip | The block pointers that the inode has are invalid. Depending on how special the inode is, this can be an Abort (inode file, directory) or a skip class error (regular file). |
| Unexpected Holes | Abort/ Skip | The inode being processed, had unexpected holes in it. Depending on how special the inode is, this |

TABLE 1-continued

| Error | Class | Description |
|---|---|---|
| | | can be an Abort(inode file, directory) or a skip class error (regular file). |
| Unexpected Inline File | Abort/ Skip. | The inode being processed is an inline file, but it was not expected to be. Depending on how special the inode is, this can be an Abort (inode file, directory) or a skip class error (regular file). |
| Invalid File Length | Abort/ Skip | The inode being processed has an invalid length field value. Depending on how special the inode is, this can be an Abort (inode file, directory) or a skip class error (regular file). |
| Corrupt Directory | Abort | The Directory being processed is corrupted. |
| Invalid Root Vnode | Abort | The Inode of the root directory of a VFS being backed up, is invalid. |
| Corrupt Directory Inode | Abort | The Inode of the Directory being processed is corrupted. |
| Corrupt ACL Vnode | Abort/ Skip | The acl vnode number of the of the inode being processed, is corrupted. Depending on how special the inode is, this can be an Abort (directory) or a skip class error (regular file). |
| Invalid Mode | Abort/ Skip | The mode bits of the inode being processed is invalid. Depending on how special the inode is, this can be an Abort (inode file, directory) or a skip class error (regular file). |
| Invalid File Type | Skip | The inode being processed has an invalid filetype. |
| Invalid Device Type | Skip | The inode being processed, a device file, has an invalid device type. |
| Invalid Major/Minor Numver | Skip | The inode being processed, a device file, has an invalid major/minor number. |
| File Should Be Inline | Skip | The inode being processed is not an inline file but is expected to be. |
| Corrupt ACL Inode | Skip | The inode being processed, an ACL, is corrupted. |
| Invalid Inline File | Skip | The inode being processed, an Inline file, is invalid. |
| Zero Length Directory | Skip/Abort | The inode being processed, a directory, has zero length. |

Each error is identified in Table 1 above by an arbitrary descriptive name, a class identifying the error as terminal or not—or possibly both, —and a brief description of the error. The specific scan for each specific error can be tailored to each error. For example, if the filetype of an inode does not indicate that the file is an inline file, but the block pointers contain regular text data instead of recognized valid block pointers, then an Unexpected Inline File error may be returned.

Similarly, if a file is identified as an inline file, but the file length filed indicates a length larger than the maximum inline file size, then an Invalid File Length error of Skip class may be returned. Furthermore, if an inode being scanned is an inline file but the filetype indicates a non-inline file type, then an Unexpected Inline File error is returned, which may be either Abort class—if the inode is for an inode file or a directory—or a Skip class—if the inode is for another file type. Scanning for the other errors can be similarly implemented.

Various scanning methods and processes can be assembled using the errors described in Table 1. The order and priority of the errors can be rearranged. For example, possible Abort class errors (fatal errors) may be scanned for prior to Skip class errors (non-fatal errors). Furthermore, other corruption checks not operating on the file/inode level may be added.

In one embodiment described above, the storage component is checked for corruption twice during backup; once during the inode file scan, and once during file read stage. However in other embodiments, the corruption checking may be limited to either scan, both need not be performed. Thus, in some embodiments, corruption checking is performed only at the time when the inode file scan identifying files needed to be backed up is performed. In other embodiments, corruption checking is only performed during file read.

The present invention has been described in the context of a file system that uses inodes to organize files. Many popular file systems are organized in this manner. However, the embodiments of the present can also be utilized during backups in file systems that are organized differently, even file systems that do not use inodes at all.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment. Thus, a method and apparatus for a storage server configured to perform backup on a mirror image of a target storage component have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   receiving a backup command at a storage server, the backup command requesting that the storage server perform a backup operation on a storage component; and
   performing corruption checking over the storage component as part of the backup operation in response to the backup command,
   wherein the corruption checking comprises, in the storage server,
      initial scanning of the storage component for corruption,
      identifying one or more corrupted files of a file system of the storage server on the storage component by utilizing a plurality of corruption tests, each of which tests for a different type of error, and
      determining whether corruption in the one or more corrupted files is fatal or non-fatal, and
   the backup operation comprises
      copying uncorrupted files from the storage component to a backup facility and skipping the one or more corrupted files with non-fatal corruption.

2. The method of claim 1, wherein the storage server comprises a file server.

3. The method of claim 1, wherein the storage component comprises a volume.

4. The method of claim 1, wherein the storage component comprises a virtual file system ("VFS").

5. The method of claim 1, further comprising:
   aborting the backup operation when the corruption checking detects a fatal error.

6. The method of claim 1, further comprising:
   skipping the one or more corrupted files and continuing the backup operation.

7. The method of claim 1, wherein the backup operation is an NDMP based backup operation.

8. A storage server comprising:
   a storage adapter through which to communicate with a storage subsystem that includes a plurality of storage components;
   a network adapter through which to receive data access requests from a storage client; and
   a processor configured to control the storage server so as to cause the storage server to perform corruption checking over a target storage component as part of a backup operation performed in response to the storage server receiving a backup command, wherein the corruption checking comprises
      identifying one or more corrupted files of a file system of the storage server on the target storage component by utilizing a plurality of corruption tests, each of which tests for a different type of error,
      determining whether corruption in the one or more corrupted files is fatal or non-fatal, and
      aborting the backup operation when the corruption checking detects a fatal error, but when the corruption checking detects only one or more non-fatal errors, then copying uncorrupted files from the storage component to a backup facility and skipping any corrupted files with non-fatal corruption.

9. The storage server of claim 8, wherein the processor is further configured to alert a user about the fatal error.

10. The storage server of claim 8, wherein the storage server comprises a file server.

11. The storage server of claim 8, wherein each of the plurality of storage components comprises a volume.

12. The storage server of claim 8, wherein each of the plurality of storage components comprises a virtual file system ("VFS").

13. The storage server of claim 8, wherein the corruption checking further comprises, prior to said identifying one or more corrupted files:
   initial scanning of an inode file of the target storage component.

14. A method comprising:
   receiving a backup command at a storage server, the backup command requesting that the storage server perform a backup operation on a storage component;
   scanning a set of inodes associated with the storage component to determine a subset of inodes corresponding to files to be backed up;
   identifying one or more corrupted files of a file system of the storage server during the scanning of the set of inodes, wherein a plurality of corruption tests are utilized for identifying the one or more corrupted files, wherein each of the plurality of corruption tests is for detecting a different type of error; and
   determining whether corruption in the one or more corrupted files is fatal or non-fatal.

15. The method of claim 14, further comprising performing the backup operation by skipping the one or more corrupted files and continuing the backup operation.

16. The method of claim 15, further comprising generating a message to a user identifying the one or more corrupted files.

17. The method of claim 14, further comprising identifying whether one of the subset of inodes or its corresponding file is corrupted.

18. The method of claim 17, wherein performing the backup operation further comprises copying the subset of inodes and corresponding files to digital tape.

19. The method of claim 14, wherein the storage server comprises a file server.

20. The method of claim 14, wherein the storage component comprises a volume.

21. The method of claim 14, wherein the storage component comprises a virtual file system ("VFS").

22. The method of claim 14, wherein the backup command comprises an NDMP_START_BACKUP command.

23. The method of claim 14, wherein the backup operation is an NDMP based backup operation.

24. A method comprising:
   receiving a backup command at a storage server, the backup command requesting that the storage server perform an NDMP based backup operation on a storage component; and
   in response to the backup command,
      scanning a set of inodes associated with the storage component to determine a subset of inodes corresponding to files to be backed up;
      identifying one or more corrupted files during the scanning of the set of inodes; and
      determining whether the one or more corrupted files warrant aborting the backup operation.

25. The method of claim 24, wherein the backup command comprises an NDMP_START_BACKUP command.

26. The method of claim 24, wherein said identifying one or more corrupted files comprises utilizing a plurality of corruption tests, each of which tests for a different type of error.

* * * * *